July 31, 1962 R. W. BATTEN 3,047,182
FASTENER INSTALLING TOOL
Filed April 7, 1961 2 Sheets-Sheet 1

INVENTOR.
RONALD W. BATTEN
BY Angus & Mon
ATTORNEYS.

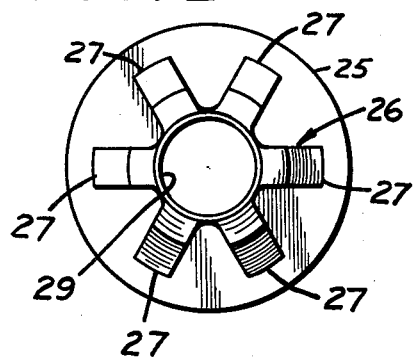
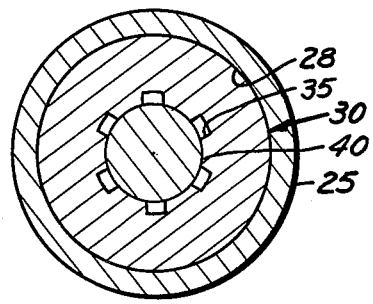
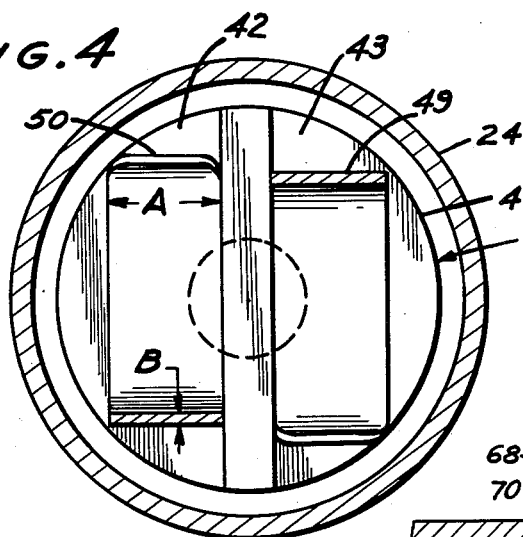
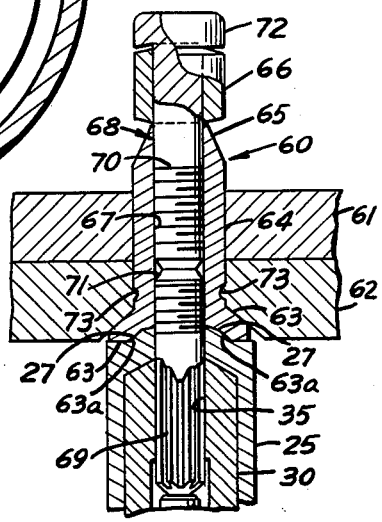
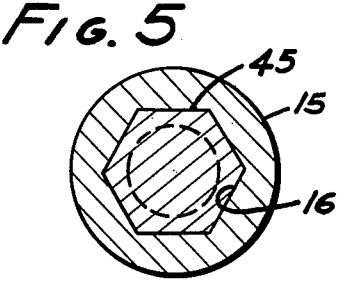
INVENTOR.
RONALD W. BATTEN

UNITED STATES PATENT OFFICE 3,047,182
Patented July 31, 1962

3,047,182
FASTENER INSTALLING TOOL
Ronald W. Batten, Torrance, Calif., assignor to Hi-Shear Corporation, Torrance, Calif., a corporation of California
Filed Apr. 7, 1961, Ser. No. 101,487
7 Claims. (Cl. 218—43)

This invention relates to a tool for setting fasteners.

While the tool disclosed herein is useful for setting many types of fasteners whose setting is accomplished by imparting rotational movement to parts of them, it finds its principal utility in connection with that class of fastener shown in the presently co-pending George S. Wing and Michael M. Schuster patent application, Serial No. 75,744, filed December 14, 1960, entitled "Blind Fastener," which is assigned to the same assignee as the instant application. This class of fastener includes an exterior sleeve having a head at one end and an exterior taper at the other end, with an internally threaded bore passing through the length of the sleeve. A mandrel is threaded into the sleeve, and includes a head on that end which is adjacent to the tapered end of the sleeve. A collar surrounds the mandrel and when the mandrel is turned in the sleeve, is pushed up over the tapered sleeve to form an expanded head. There is thus provided a blind fastener which can be installed from one side of the work. The mandrel is sometimes provided with a breakneck section which is adapted to torque off when the collar has been appropriately set.

Ordinarily a tool for setting such fasteners includes a means for counter-rotating the mandrel and the sleeve, such as by blades on the tool's housing for holding the sleeve against rotation, and a rotary driver adapted to engage an end of the mandrel so as to turn it inside the sleeve.

There are numerous tools in existence for providing this type of counter-rotation, but none of them has been entirely satisfactory. One reason is that, as the mandrel is turned in the sleeve, means must be provided within the tool for permitting the driver of the tool to back away from the work as the mandrel moves axially in the sleeve, such as by a sliding key and keyway in the drive. A large amount of energy is dissipated in friction between the key and the keyway, and the more the torque, the greater is the dissipated energy. While this energy may seem small compared with the total energy available from the tool, it must be realized that in this type of device, considerable force is needed for a proper torquing off of the mandrel; that is, something of the nature of a fly wheel effect is required in the tool. This type of tool ordinarily uses a small hand-held air-powered motor whose physical size and weight must be kept small because it is carried by workmen all day long. Therefore, any feature which increases the dissipation of energy decreases the effectiveness of the tool and, in fact, has rendered some installating tools borderline in their performance. In addition, this dissipated energy is part of an unbalanced force system which the operator has to resist to use the tool. The additional effort is fatiguing and undesirable.

It is an object of this invention to provide a driving tool for setting fasteners wherein counter-rotative forces can be exerted, together with means for backing off the driver member which are frictionless, and which therefore do not dissipate energy which ought to be made available for its fly wheel or power effect in the setting of the fastener, and also reducing the forces the operator has to resist. It has been found in actual practice that this results in a much more effective installation tool, permitting larger fasteners to be driven with tools of the same bulk and power rating, and enabling the operator to use it with less effort and fatigue.

This invention is carried out in combination with a motor having a motor housing, and a drive shaft to both of which the device is attached. The device includes a driver housing, one portion of which is attached to the motor housing, and which carries on it fastener-engaging means. Within the driver housing there is disposed a driver which is rotatable and axially reciprocable in the housing.

Also within the housing, there is a driven shaft adapted to be attached to and driven by the drive shaft. A spring linkage interconnects the driven shaft and the driver. The spring linkage is a blade spring which is resistant to deformation by torque so it transmits torque from the driven shaft to the driver, but which is compressible to enable the driver to move toward and away from the driven shaft. The driver also carries fastener engaging means.

According to a preferred but optional feature of the invention, the driver housing is adapted to reciprocate axially toward and away from the motor housing and a clutch is disposed between the motor and the drive shaft. Movement of the driver housing toward the motor housing serves to engage the clutch and thereby apply power to the driver. Moving the driver housing the other way releases the clutch. The motor can thereby be kept running, while the driver is easily engaged and disengaged with it.

The above and other features of the invention will be fully understood from the following detailed description and the accompanying drawings in which:

FIG. 2 is an end view taken at line 2—2 of FIG. 1; and

Figure 1:
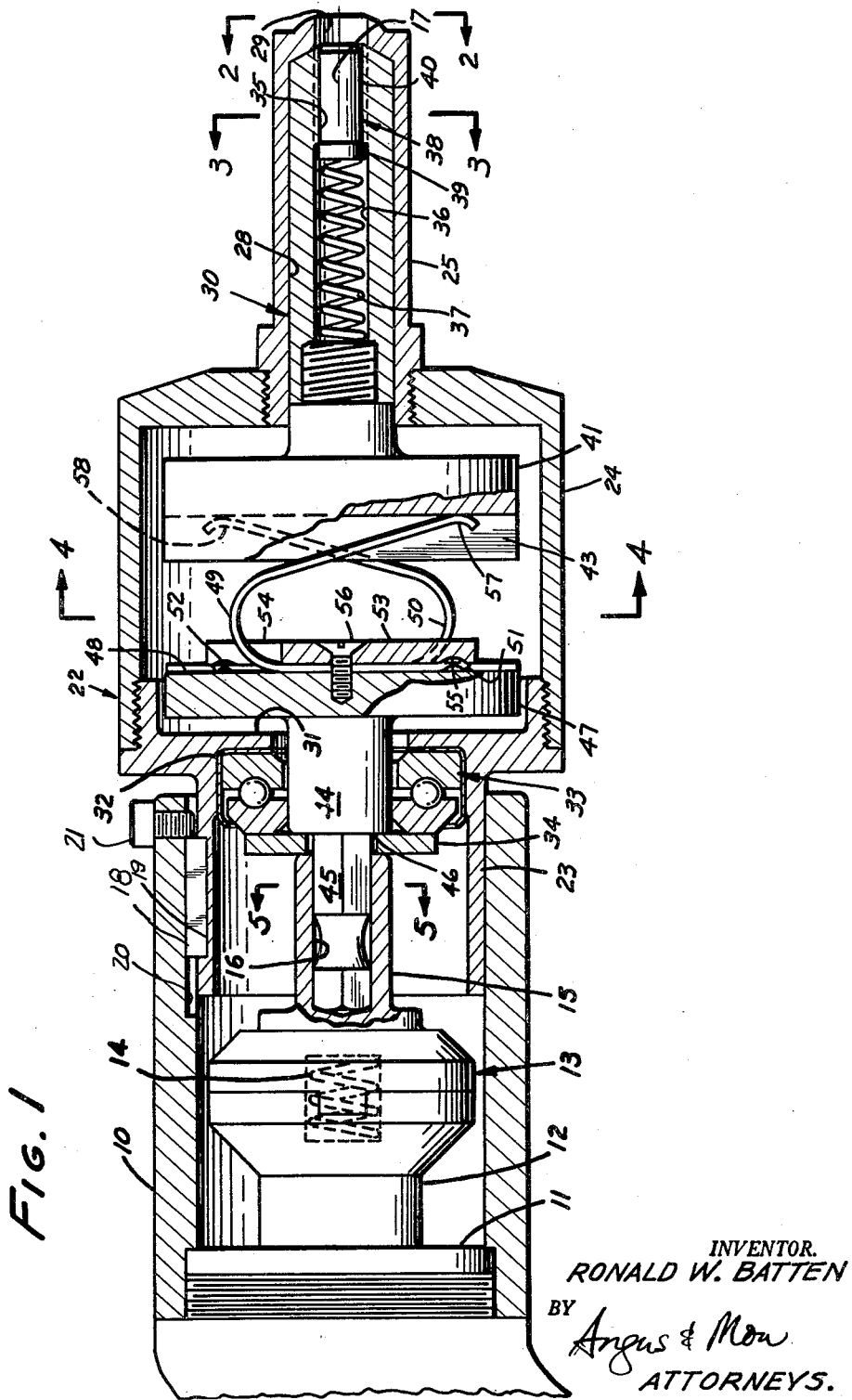
FIG. 1 is a side view partly in cutaway cross-section and partly in schematic notation showing the presently preferred embodiment of the invention.

FIGS. 3, 4 and 5 are cross-sections taken at line 3—3, 4—4, and 5—5, respectively, of FIG. 1.

In FIG. 1, there is shown the motor housing 10 of a conventional hand-held air motor, such as an ARO air motor No. 7303C, manufactured by The Aro Equipment Corporation, Bryant, Ohio. Such an air motor includes a hand-held housing, an internally mounted motor 11, and a drive 12. The drive customarily includes a clutch 13 shown schematically in the drawings. This clutch has a spring load 14 which tends to disengage the clutch unless an end load is exerted on it. In the condition of the device in FIG. 1, the schematically-illustrated clutch is disengaged. It will be engaged by end load pressure from the right on a drive shaft 15 which may be driven by the motor through the clutch. The drive shaft has a hexagonal socket 16 at its end. The socket is centered on the axis of rotation 17 of the rotational parts of the tool.

A driver housing 22 includes a neck portion 23, a central portion 24, and a nose portion 25. Neck portion 23 makes a sliding fit in the motor housing. A key 18 fits in groove 19 in the neck portion and groove 20 in the motor housing, groove 20 being the longer. A stop 21 holds the key in groove 20. The key constrains the housings to mutual rotation, but because slot 20 is longer than the key, axial reciprocation is possible.

The nose portion has fastener engaging means 26 on its end (see FIG. 2) which may conveniently comprise blades 27 arrayed in a six-pointed pattern, or such other number of blades in such other pattern as may be dictated by the type of slots to be engaged by the blades. The nose portion has a cylindrical passage 28 and a cylindrical opening 29 therein. Opening 29 is adapted to pass the end of a mandrel. Passage 28 is adapted to receive a driver 30 which is adapted to rotate and axially reciprocate therein.

The driver housing includes a bearing support shoulder 31, which faces toward the motor, and which supports a retainer 32. Within the retainer there is fitted a thrust bearing 33. The thrust bearing in turn is borne against by a washer 34, which is engaged by drive shaft 15 when the driver housing is pressed toward the motor housing.

Driver 30 has a splined opening at its end adjacent opening (see FIG. 3) 29 which forms fastener engaging means 35. Instead of splines, the opening could have prismatic walls, or be formed in another fastener-engaging configuration. It also includes a counter-bore 36 which intersects means 35. A spring 37 is placed in the counter-bore and a headed ejector pin 38 is fitted with its head 39 in the counter-bore and its shank 40 in means 35. It will thereby be seen that the ejector is spring-loaded toward opening 29.

FIG. 6 illustrates the right-hand end of the tool of FIG. 1 in driving position with a fastener 60. The fastener is a blind rivet which includes a torque-off portion. It is to be understood that, in illustrating this particular fastener, no limitation on the generality of the tool is intended, because the tool is useful for setting a wide variety of fasteners and types of fasteners. However, it is particularly useful in setting types wherein one fastener part is held against rotation, while another part is turned and simultaneously backed off, with an ultimate torque-off fracture of a part of the fastener.

Fastener 60 is shown being set to rivet together plates 61 and 62. Head 63 of the fastener is pressed against plate 62 so that blades 27 enter into and engage in matching recesses 63a in the head. The driver housing thereby holds the fastener head, and with it sleeve 64 with which the head is integral, against rotation.

The opposite end of the sleeve from the head tapers to a thin edge 65 adjacent to which is a collar 66. Internal threads 67 are formed in the wall of an axial passage through the sleeve.

A mandrel 68 has an end with splines 69, external threads 70 engaged to threads 67, peripheral groove 71, and a head 72. Head 72 overhangs the collar. Turning the mandrel counterclockwise in the sleeve will serve to draw the mandrel head toward the sleeve, forcing the collar ahead of it. The collar is forced over the end of the sleeve to form a rivet "head" at the blind end by this motion. After the "head" is formed, torque builds up to a value sufficient to torque off the splined end of the mandrel at groove 71. The fastener is then fully set.

Dimples 73 in the outside of the sleeve are formed by pressing the sleeve slightly out of round, this out of round condition forming a mandrel-retaining means which holds the mandrel from unthreading readily after the fastener is set. The splines on the mandrel and the splines of fastener-engaging means 35 engage to transmit torque from the driver to the mandrel.

A disc-shaped face plate 41 forms part of the driver. It has a pair of parallel grooves 42, 43 (see FIG. 4) facing toward the motor housing.

A driven shaft 44 includes a hexagonal neck 45 adapted to engage with and be driven by the walls of hexagonal socket 16. It includes a step shoulder 46 against which the washer can be brought to bear. One portion of the thrust bearing supports the driven shaft for rotation relative to the driver housing.

A face plate 47 which faces toward face plate 41 forms part of the driven shaft, and includes a pair of grooves 48 which receive the ends of U-shaped springs 49, 50, which springs are made of bent flat flexible metal spring stock. These ends have humps 51, 52, respectively. A retainer plate 53 is provided with two declivities, such as declivity 55, for receiving the respective humps. Plate 53 is mounted to face plate 47 by two screws 56. The ends of the springs are thereby pressed flat against face plate 47. They are side-supported by the walls of their respective grooves so that torque is transmitted by them. They are end-supported against movement along the grooves by engagement of the humps in the declivities.

The free ends 57, 58 of the springs 49, 50 fit into grooves 42, 43 in face plate 41. The free ends are side-supported by the walls of the grooves in plate 41 so that torque is transmitted to the driver by the springs.

The springs are wider (dimension A, FIG. 4) than they are thick (dimension B, FIG. 4). As can be seen from the drawings, the ratio of width to thickness is of the order of 8 to 1. It will be recognized that the essential feature of these springs is that they be not appreciably deformed by torque. Then they will tend to transmit torque from the driven shaft to the driver. On the other hand, they need to be reasonably flexible to permit the driver to reciprocate relative to the driven shaft. This dictates flexibility in bending in the plane of FIG. 1, but relative inflexibility in twist. While it is possible to have large springs which are made of very thick stock, whose ratio of width to thickness may be much smaller, this makes a stiffer spring, and one which resists the axial movement of the driver. Too much resistance of this type is undesirable, because the operator would have to lean too hard on the tool to keep the nose portion engaged in the fastener. Therefore a width to thickness of ratio of the order of between 5 and 10 to one appears desirable. The thickness of the springs transmits axial forces. The width of the springs transmits torque.

The driver, drive shaft, driven shaft, and openings in them are all coaxial on the axis of rotation. The operation of this device should be evident from the foregoing. In order to drive a fastener, the fastener engaging means 26 on the nose portion are engaged in the recesses in the head of the fastener's sleeve, and the stub of the mandrel is placed in the fastener engaging means 35 of the driver. This will move the ejector to the left in FIG. 1. Spring 37 is ordinarily weaker than spring load 14 in the clutch, so the clutch remains disengaged. The motor may be in constant operation but the driver will not be turning. Next, the motor housing is pressed toward the fastener, (to the right in FIG. 1). The fastener is, of course, backed up by structure to which it is being applied. As a result, the two housings will be moved toward each other, and, in turn, the motor housing will press toward and against the drive shaft. This overpowers the spring load in the clutch and the clutch will become engaged. Power will then be transmitted to the driven shaft, through the spring linkage consisting of the flat springs, and to the driver, turning it. As the mandrel is drawn out of the sleeve, the driver will back off in the nose portion and move to the left in FIG. 1. This movement is relatively frictionless, because it involves only the flexure of the springs, and does not involve any relative axial motion between the driver and the mandrel. The back up force for the flexure is provided by the operator's pressure on the tool. It does not come from the motor. All the motor need do is turn the mandrel, and the mandrel and driver move inwardly into the driver housing in unison without slippage or any resulting friction. All motor power is thereby conducted to the driver, and used substantially exclusively in turning the mandrel, without significant dissipation.

Finally the fastener is tightened down, and the breakneck portion of the mandrel will fail, releasing the driver. The tool will then be moved away from the fastener by the operator. The spring load in the clutch now tends to disengage the clutch, by applying force through the thrust bearing to move the driver housing to the right in FIG. 1 relative to the motor housing. At the same time, the spring load on the ejector will eject the stub of the mandrel from the driver, and the driving operation can be repeated on another fastener. It will be noted that during the entire cycle, the motor power was left on.

It is, of course, possible to do without the clutch in which case the construction will be the same as shown or with the exception that the slot in the driver housing may be eliminated. The motor housing and driver housing would be rigidly attached to each other. Then the motor would be turned on and off each time it is used. It is, however, a convenience to be able to leave the motor on.

It has been found in practice that the tool of this invention gives a very suitable "fly wheel" effect, and utilizes substantially all of the power available from the motor to drive the fastener and to torque off the mandrel stub. This is in marked contrast with previous devices of the type which use keys and keyways for backing off the driver, wherein a substantial amount of energy is lost by virtue of the friction inherent in such mechanisms. In such other devices, performance is often marginal unless oversized tools are used.

This invention is not to be limited by the embodiment shown by the drawings and described in the description which is given by way of example and not of limitation, but only in accordance with the scope of the appended claims. For example, it is evident that the form of fastener engaging means used can be changed to suit the needs of the fastener being installed. Furthermore, some fasteners may not require two sets of fastener engaging means. When the fastener includes only a single part, such as simple screw, or when one part is non-rotational, perhaps because it is held in a body with an interference fit, then only the driver need be provided with fastener engaging means.

I claim:

1. A fastener installing tool comprising: a driven shaft adapted to be turned by a motor; a driver; fastener-engaging means on the driver; said driven shaft and driver having a common axis of rotation, and a spring linkage interconnecting the driven shaft and driver, the spring linkage comprising a spring whose width is substantially greater than its thickness, and whose thickness is disposed so as to transmit said axial movement, and whose width is disposed so as to transmit rotational movement.

2. A fastener according to claim 1 in which the spring is U-shaped, with an end attached to one of the driven shaft and driver, and the other end in compressive abutment with the other of said driven shaft and driver.

3. A fastener installing tool comprising: a driven shaft adapted to be turned by a motor; a driver; a driver housing having a passage opening at an end thereof, the driver being axially and rotationally disposed in the passage, the driver and driven shaft facing each other in the driver housing; a spring linkage in said driver housing attached to one of the driven shaft and driver, and abutting the other to rotationally join the two and to bias them apart; and fastener engaging means on the driver, the driver, fastener engaging means and driven shaft all having a common axis of rotation.

4. A fastener according to claim 3 in which additional fastener engaging means are provided on the driver housing.

5. A fastener according to claim 3 in which a motor including a drive is provided for turning the driven shaft, said drive including a clutch engageable by compressive forces exerted on it, and in which a motor housing mounts the drive and the driver housing, the driver housing being axially reciprocable relative to the motor housing, whereby pressing the driver housing toward the motor housing engages the clutch to connect the motor to the driven shaft.

6. A fastener according to claim 5 in which the spring linkage comprises a spring made of material whose width is substantially greater than its thickness, and whose thickness is disposed so as to transmit said axial movement, and whose width is disposed so as to transmit rotational movement.

7. A fastener according to claim 6 in which the spring is U-shaped, with an end attached to one of the driven shaft and driver, and the other end in compressive abutment with the other of said driven shaft and driver.

No references cited.